(12) United States Patent
Hao et al.

(10) Patent No.: US 11,474,686 B2
(45) Date of Patent: Oct. 18, 2022

(54) METHOD AND DEVICE FOR IMPLEMENTING SCREEN CAPTURE, AND STORAGE MEDIUM

(71) Applicant: ZTE CORPORATION, Guangdong (CN)

(72) Inventors: Zhijian Hao, Guangdong (CN); Yu Zhu, Guangdong (CN); Xuemin Zhou, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 291 days.

(21) Appl. No.: 16/762,158

(22) PCT Filed: Sep. 14, 2018

(86) PCT No.: PCT/CN2018/105844
§ 371 (c)(1),
(2) Date: May 7, 2020

(87) PCT Pub. No.: WO2019/091215
PCT Pub. Date: May 16, 2019

(65) Prior Publication Data
US 2020/0363941 A1    Nov. 19, 2020

(30) Foreign Application Priority Data

Nov. 9, 2017    (CN) .......................... 201711108407.6

(51) Int. Cl.
| | |
|---|---|
| *G06F 3/0488* | (2022.01) |
| *G06F 3/04883* | (2022.01) |
| *G06F 3/0482* | (2013.01) |
| *G06F 3/04847* | (2022.01) |

(52) U.S. Cl.
CPC ........ *G06F 3/04883* (2013.01); *G06F 3/0482* (2013.01); *G06F 3/04847* (2013.01); *G06F 2203/04808* (2013.01)

(58) Field of Classification Search
CPC .. G06F 3/0482; G06F 3/0484; G06F 3/04847; G06F 3/0488; G06F 3/04883; G06F 2203/04808
See application file for complete search history.

(56) References Cited

U.S. PATENT DOCUMENTS

2010/0269029 A1    10/2010    Siegel et al.

FOREIGN PATENT DOCUMENTS

| | | |
|---|---|---|
| CN | 103092524 A | 5/2013 |
| CN | 103092525 A | 5/2013 |
| CN | 103530056 A | 1/2014 |
| CN | 104090716 A | 10/2014 |

(Continued)

OTHER PUBLICATIONS

International Search Report for the International Patent Application No. PCT/CN2018/105844, dated Dec. 24, 2018, 2 pages.

(Continued)

*Primary Examiner* — Stacy Khoo
(74) *Attorney, Agent, or Firm* — KDB Firm PLLC

(57) ABSTRACT

Disclosed are a method and a device for implementing screenshot, and a storage medium. The method includes: when a trigger condition is satisfied, a terminal entering a screenshot mode; and when the terminal detects a touch action after entering the screenshot mode, the terminal capturing, according to the touch action, part or all of the contents of a screen.

17 Claims, 6 Drawing Sheets

(56) References Cited

FOREIGN PATENT DOCUMENTS

| | | |
|---|---|---|
| CN | 104360816 A | 2/2015 |
| CN | 104536661 A | 4/2015 |
| CN | 104898926 A | 9/2015 |
| CN | 105718161 A | 6/2016 |
| CN | 106325663 A | 1/2017 |
| CN | 106502524 A | 3/2017 |
| CN | 106603829 A | 4/2017 |
| CN | 107092427 A | 8/2017 |
| CN | 107273009 A | 10/2017 |
| CN | 108205412 A | 6/2018 |

OTHER PUBLICATIONS

First Office Action for the Chinese Patent Application No. 201711108407.6, dated Feb. 11, 2019, 15 pages.
Second Office Action for the Chinese Patent Application No. 201711108407.6, dated Apr. 19, 2019, 17 pages.
Third Office Action for the Chinese Patent Application No. 201711108407.6, dated Jun. 10, 2019, 16 pages.

METHOD AND DEVICE FOR IMPLEMENTING SCREEN CAPTURE, AND STORAGE MEDIUM

CROSS-REFERENCE TO RELATED APPLICATIONS

This is a U.S. National Stage Application, filed under 35 U.S.C. 371, of International Patent Application No. PCT/CN2018/105844, filed on Sep. 14, 2018, which claims priority to Chinese patent application No. 201711108407.6 filed on Nov. 9, 2017, contents of both of which are incorporated herein by reference in their entireties.

TECHNICAL FIELD

The present disclosure relates to, but is not limited to, the field of terminal techniques, and in particular, to a method and a device for implementing screenshot, and a storage medium.

BACKGROUND

Nowadays, with information pluralism and social convenience, the sharing and transmission of information is encountered by almost everyone every day, and the terminal has become an indispensable communication and entertainment tool in people's work and life. With the popularity of the terminal, the screenshot operation becomes an indispensable function of the terminal. However, the screenshot mode in the related art either cannot implement partial screenshot, or has low screenshot efficiency.

SUMMARY

In view of the above, embodiments of the present disclosure intend to provide a method and a device for implementing screenshot, and a storage medium, which can improve screenshot efficiency, thereby improving user experience.

The embodiments of the present disclosure provide a method for implementing screenshot. The method includes the steps described below.

In response to a trigger condition being satisfied, a terminal enters a screenshot mode.

When the terminal detects a touch action after entering the screenshot mode, the terminal captures part or all of contents of a screen according to the touch action.

The embodiments of the present disclosure provide a method for implementing screenshot. The method includes the steps described below.

In response to detecting at least two touch points within a second preset time and a touch parameter of at least one touch point being greater than or equal to a second preset threshold, a terminal enters a screenshot mode.

Part or all of contents of a screen are captured according to the touch point with the touch parameter less than the second preset threshold.

The embodiments of the present disclosure provide a device for implementing screenshot. The device includes a first screenshot preprocessing module and a first screen shoot module.

The first screenshot preprocessing module is configured to, in response to a trigger condition being satisfied, enter a screenshot mode by a terminal.

The first screen shoot module is configured to, when the terminal detects a touch action after entering the screenshot mode, capture part or all of contents of a screen according to the touch action.

The embodiments of the present disclosure provide a device for implementing screenshot. The device includes a second screenshot preprocessing module and a second screen shoot module.

The second screenshot preprocessing module is configured to, in response to detecting at least two touch points within a second preset time and a touch parameter of at least one touch point being greater than or equal to a second preset threshold, enter a screenshot mode by a terminal.

The second screen shoot module is configured to capture part or all of contents of a screen according to the touch point with the touch parameter less than the second preset threshold.

The embodiments of the present disclosure provide a terminal. The terminal includes a memory and a processor.

The memory is configured to store a program for implementing screenshot.

The processor is configured to execute the program. The program, when executed, implements the method for implementing screenshot according to the embodiments of the present disclosure.

The embodiments of the present disclosure provide a computer-readable storage medium. The computer-readable storage medium stores a computer program which, when executed by a processor, implements steps of any one of methods for implementing screenshot.

In the embodiments of the present disclosure, the terminal firstly enters the screenshot mode and then performs screenshot according to a touch action, and thus a success rate of screenshot and the user experience are improved compared with the related art.

In the above solution, the screenshot mode is enabled by means of detecting a roll action or a shake action within a first time, or the screenshot mode is enabled by means of detecting at least two touch points within a second preset time and a touch parameter of at least one of the touch points being greater than or equal to a second preset threshold, that is, the screenshot mode can be enabled simply through a rolling or shacking action, or the screenshot mode can be enabled simply through a touch operation (different from a normal touch operation), which is simple and convenient, provides a basis for a subsequent screenshot operation, and improves the success rate of entering the screenshot mode, thereby improving the success rate of screenshot.

In the above solution, the screenshot can be implemented according to a touch action corresponding to a touch point with a touch parameter less than the second preset threshold, or according to a touch action detected after the screenshot mode is enabled, that is, the screenshot can be implemented simply through a touch operation, which simply and quickly implements the screenshot and improves the success rate of screenshot.

In the above solution, the touch action includes one or more kinds of touch actions; and different touch actions correspond to different screenshot manners. When the touch action is a slide action, different slide directions correspond to different screenshot manners. The screenshot manner may be to capture all of the contents of the screen, or may be to capture part of the contents of the screen, which improves the user experience.

DETAILED DESCRIPTION

The objects, technical solutions and advantages of the present disclosure will be clearer from a detailed description of embodiments of the present disclosure in conjunction with the drawings. It is to be noted that if not in collision, the embodiments and features therein in the present disclosure may be combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

In the research process, the inventor finds that the screenshot can be implemented in the following manners.

In one manner, the screenshot is implemented by three fingers, that is, when there are three touch points on a screen and the touch point sliding exceeds a certain threshold length, the entire screen is captured. However, for the manner of three-finger screenshot, on one hand, only the full screen shooting can be implemented, and partial screenshot cannot be implemented; and on the other hand, for a terminal with a small screen, it is not easy to put three figures on the screen at the same time, and it is even more difficult to slide more than a certain threshold length. Therefore, the success rate of this screenshot manner on the terminal with small screen is low.

In another manner, screenshot is implemented by a combination of buttons. Due to many reasons, such as appearance and cost, it is impossible to set a specific button for the screenshot function. The screenshot function is usually implemented through a combination of buttons, such as a combination of a power button and a volume button. The screenshot manner using the button combination requires different buttons. However, because of the design difference of physical buttons, it is difficult to keep the two physical buttons in synchronization, which causes the problem of the low success rate of screenshot. Moreover, the button combination operation is inconvenient, reducing the user experience.

Figure 1:
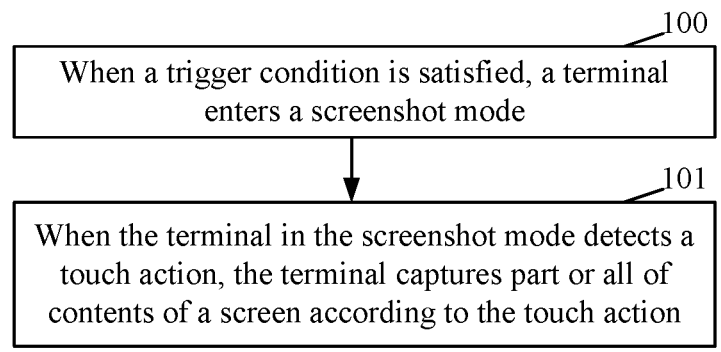
FIG. 1 is a flowchart of a method for implementing screenshot according to an embodiment of the present disclosure.

The embodiments of the present disclosure provide a method for implementing screenshot. FIG. 1 is a flowchart of a method for implementing screenshot according to an embodiment of the present disclosure. As shown in FIG. 1, the method includes steps described below.

In step 100, in response to determining that a trigger condition is satisfied, a terminal enters a screenshot mode.

In this step, whether the touch condition is satisfied can be determined in any one of the following two manners, such that the terminal enters the screenshot mode.

In the first manner, a preset action is detected within a first preset time. The preset action may be a turning action, a shaking action, or any other actions, which is not limited in the present disclosure, and the specific action is not intended to limit the scope of the present disclosure. The first preset time may start from the time when a first preset action is detected, that is, a timer is started after the first preset action is detected. Before the timer expires, the terminal continues to detect the preset action, and the number of detected preset actions is counted. When the number of detected preset actions is counted, the first one of the detected preset actions may be included, or the first one of the detected preset action may not be included. The first preset time may also be a period of periodic detection, that is, a preset action is detected within each first preset time, and the number of times the preset action is detected within the first preset time is counted.

In one embodiment, when the number of times the preset action is detected within the first preset time is greater than or equal to the preset number of times, it is considered that the trigger condition is satisfied, that is, the terminal is triggered to enter the screenshot mode.

When the preset action is a turning action, a turning angle of the terminal with respect to a first axis is detected. If the terminal is turned around the first axis clockwise first and then is turned around the first axis counterclockwise, and the turning angle in clockwise is greater than or equal to a first preset angle and the turning angle in counterclockwise is greater than or equal to a second preset angle, or if the terminal is turned around the first axis counterclockwise first and then is turned around the first axis clockwise, and the turning angle in counterclockwise is greater than or equal to a third preset angle and the turning angel in clockwise is greater than or equal to a fourth preset angle, it is considered that a turning action is detected. The first axis is an axis parallel to the screen of the terminal, such as a long side, a short side or any other side of the terminal.

When the preset action is a shaking action, a turning angle of the terminal around a second axis is detected. If the terminal is turned around the second axis clockwise first and then is turned around the second axis counterclockwise, and the turning angle in clockwise is greater than or equal to a fifth preset angle and the turning angle in counterclockwise is greater than or equal to a sixth preset angle, or if the terminal is turned around the second axis counterclockwise first and then is turned around the second axis clockwise, and the turning angle in counterclockwise is greater than or equal to a seventh preset angle and the turning angle in clockwise is greater than or equal to an eighth preset angle, it is considered that a shaking action is detected. The second axis is an axis perpendicular to the screen of the terminal.

In one embodiment, the turning angle of the terminal around the first axis or the second axis can be detected through an angle sensor or a six-axis sensor.

In the second manner, a touch point is detected within a second preset time. In response to detecting at least two touch points within the second preset time and a touch parameter of at least one of the touch points being greater than or equal to a second preset threshold, it is considered that the trigger condition is satisfied.

The second preset time may start from the time when a first touch point is detected, that is, a timer is started after the first touch point is detected. The terminal proceeds to detect the touch point before the timer expires, and determines whether there is a touch point whose touch parameter is greater than or equal to the second preset threshold. The second preset time may also be a period of periodic detection, that is, within each second preset time, the touch point is detected and whether there is a touch point whose touch parameter is greater than or equal to the second preset threshold is determined.

In one embodiment, when one touch point is detected within the second preset time, this touch point is normally processed as a single point touch.

When at least two touch points are detected within the second preset time and the touch parameter of each of these touch points is less than the second preset threshold, the touch points are normally processed as a multi-point touch.

When at least two touch points are detected within the second preset time, the touch parameter of each of these touch points is less than the second preset threshold, and no touch point is detected simultaneously, each touch point is normally processed as a single point touch.

In one embodiment, a pressing duration of the touch point with the touch parameter greater than or equal to the second preset threshold may be long or short, may be greater than or equal to a preset time threshold, or may be less than the preset time threshold, which is not limited in the present disclosure. In other words, a user may click hard on the screen and then lifts the finger, or may continually press the screen.

In one embodiment, the above second manner may be implemented by adopting the following manner.

When the number of touch points detected within the second preset time is greater than or equal to N and the number of touch points with the touch parameter greater than or equal to the second preset threshold is greater than or equal to M, it is considered that the trigger condition is satisfied, where N is an integer greater than or equal to 2, and M is an integer greater than or equal to 1.

Alternatively, when the number of touch points detected within the second preset time is equal to N and the number of touch points with the touch parameter greater than or equal to the second preset threshold is equal to M, it is considered that the trigger condition is satisfied.

For example, two touch points are detected within the second preset time, which are a first touch point and a second touch point respectively, and a touch parameter of the first touch point is greater than or equal to the second preset threshold. In one embodiment, after the first touch point is detected, before the second touch pint is detected, the first touch point is continuously pressed. In other words, the user uses one figure to continuously press the screen, and uses another figure to implement the touch action, so as to enable the screenshot mode.

In another example, N touch points are detected within the second preset time, which are a first touch point, a second touch point, . . . , and an N-th touch point respectively, and a touch parameter of the first touch point is greater than or equal to the second preset threshold, where N is an integer greater than or equal to 2.

The touch parameter may be a touch area or a touch pressure. The touch area may be obtained by calculating the number of pixels on a screen occupied by the touch point, and the touch pressure may be detected through a touch pressure screen or a pressure sensor.

The above manner of entering the screenshot mode is simple and quick, which improves the success rate of entering the screenshot mode, thereby improving the success rate of screenshot.

Of course, other manners may be used for determining whether the trigger condition is satisfied. For example, a physical or virtual button is used for enabling the screenshot mode, that is, the user enables the screenshot mode when pressing the physical or virtual button. The above manners are merely illustrative, and the specific trigger condition is not intended to limit the scope of the present disclosure, details of which are not repeated herein.

In step 101, when the terminal detects a touch action after entering the screenshot mode, the terminal captures part or all of contents of a screen according to the touch action.

In this step, the touch action may be a slide action, or may be a non-slide action, such as click, double click, etc.

When the touch action is a slide action, a slide track of the slide action may be a closed graphic, or may be a non-closed graphic.

When the touch action is a slide action, part or all of the contents of the screen may be captured according to a slide direction of the slide action.

When the touch action is a non-slide action, or when the touch action is a slide action and a slide track of the slide action is a non-closed graphic, all of the contents of the screen are captured.

Capturing part or all of the contents of the screen according to the slide direction of the slide action may be implemented in any one of the following manners.

In the first manner, when the slide direction is a first preset direction, the screen is shot in any one of the following screenshot manners; and when the slide direction of the slide action is a second preset direction, the screen is shot in any one of the following screenshot manners; where the screenshot manner used when the slide direction is the first preset direction is different from the screenshot manner used when the slide direction is the second preset direction.

The screenshot manners include the following five manners:

1. capturing contents within the closed graphic of the screen;
2. capturing all of the contents of the screen, and blurring contents outside the closed graphic;
3. capturing all of the contents of the screen, and blurring the contents within the closed graphic;
4. capturing the contents outside the closed graphic of the screen; and
5. capturing all of the contents of the screen.

Figure 2:
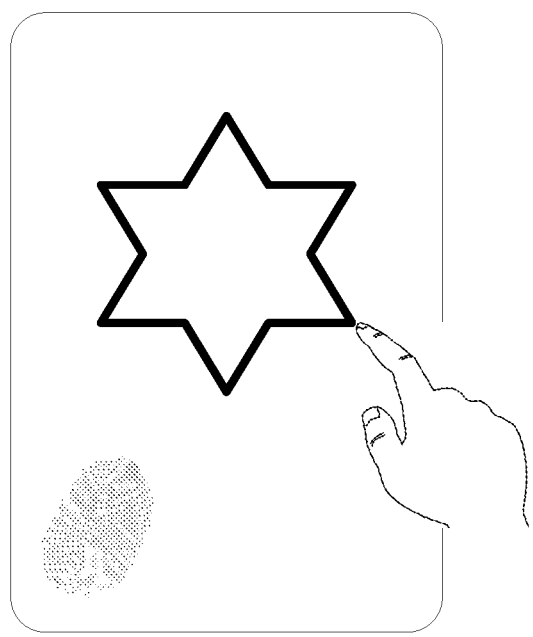
FIG. 2 is a view showing an operation on a user interface of a method for implementing screenshot according to an embodiment of the present disclosure.

For example, FIG. 2 is a view showing an operation on a user interface of a method for implementing screenshot according to an embodiment of the present disclosure. As shown in FIG. 2, the user first touches the lower left corner of the screen with a finger to form a touch point, where the touch area or the touch pressure of this touch point is greater than the second preset threshold, and then draws a closed graphic on the screen with another finger within the second preset time. When the user draws the closed graphic in a clockwise direction, the contents within the closed graphic are captured. When the user draws the closed graphic in the counterclockwise direction, all of the contents of the screen are captured and the contents outside the closed graphic are blurred.

In the above manner, the closed graphic may be a regular graphic, such as a triangle, a square, a rectangle, a pentagonal star, etc., or may be an irregular graphic, which is not limited in the present disclosure.

In the second manner, before part or all of the contents of the screen are captured according to the slide direction of the slide action, the closed graphic is preprocessed to obtain a preprocessed closed graphic, and then part or all of the contents of the screen are captured according to the slide direction of the slide action.

In one embodiment, when the slide direction is a first preset direction, the screen is shot in any one of the following screenshot manners; and when the slide direction of the slide action is a second preset direction, the screen is shot in any one of the following screenshot manners; where the screenshot manner used when the slide direction is the first preset direction is different from the screenshot manner used when the slide direction is the second preset direction.

The screenshot manners include the following five manners:

1. capturing contents within the preprocessed closed graphic of the screen;
2. capturing all of the contents of the screen, and blurring contents outside the preprocessed closed graphic;
3. capturing all of the contents of the screen, and blurring the contents within the preprocessed closed graphic;
4. capturing the contents outside the preprocessed closed graphic of the screen; and
5. capturing all of the contents of the screen.

In the above manner, since the closed graphic drawn by the user is usually an irregular graphic, the irregular graphic can be converted into a regular graphic before screenshot, so that the picture obtained after the screenshot is more beautiful, making the user satisfied. Of course, if the closed graphic drawn by the user is a regular graphic, the closed graphic may be converted into a graphic which the user desires, or the closed graphic may be converted into a graphic uniformly set by a system, details of which are not repeated herein.

In other words, the closed graphic may be preprocessed in any one of the following manners to obtain the preprocessed closed graphic:

1. converting the closed graphic into a preset closed graphic, where this preset closed graphic may be specifically set by the user, or may be uniformly set by the system;
2. converting the closed graphic into a default closed graphic, where for example, if the user does not set the preprocessed closed graphic, the closed graphic may be converted into a default system closed graphic;
3. displaying to the user a closed graphic list available for converting, receiving a selection operation inputted by the user, and converting the closed graphic into a closed graphic corresponding to the selection operation in the closed graphic list; and
4. converting the closed graphic into a closed graphic with a highest matching degree in the two or more preset closed graphics.

The closed graphic list may be displayed in multiple manners. For example, the closed graphic list can be displayed in the form of a pull-down menu, and a label in the pull-down menu is used for displaying a closed graphic, or the closed graphic list may also be displayed in the form of a pop-up window, and a label in the pop-up window is used for displaying a closed graphic. Of course, the closed graphic list may also be displayed in other manners. The specific display manner is not intended to limit the scope of this disclosure, and details are not repeated herein.

The ratio of an overlapping area of the closed graphic and the preprocessed closed graphic to an area of the closed graphic is greater than or equal to the third preset threshold. The preprocessed closed graphic may be any one of the following: a circumscribed circle of the closed graphic, or a square containing the closed graphic, or a circle containing the closed graphic, or a circle containing a preset length of the closed graphic, or a square containing the preset length of the closed graphic, etc. Of course, the preprocessed closed graphics enumerated above are only illustrative. The specific preprocessed closed graphic is not intended to limit the scope of the present disclosure, and details are not repeated herein.

In the above manner, the first preset direction may be the clockwise direction, or may be the counterclockwise direction, and the second preset direction may be the clockwise direction, or may be the counterclockwise direction.

When the first preset direction is the clockwise direction, the second preset direction is the counterclockwise direction; when the first preset direction is the counterclockwise direction, the second preset direction is the clockwise direction.

In one embodiment, before part or all of the contents of the screen are captured when the touch action is the slide action and the slide track of the slide action is the non-closed graphic, a start point and an end point of the slide track may be connected to form a closed graphic, and then the subsequent screenshot process is the same as the processing in the condition that the slide track is the closed graphic.

In one embodiment, when the ratio of a length of the line connecting the start point and the end point to a total length of the slide track is less than or equal to a first preset threshold, the closed graphic is formed after connecting the start point and the end point of the slide track.

In one embodiment, the start point and the end point may be connected through a straight line from the start point to the end point. The start point and the end point may also be connected through a curve from the start point to the end point, and the specific shape of the curve is not defined herein, as long as the curve from the start point to the end point and the slide track form a closed graphic. One or more points may be predicted according to the slide track, and then the start point and the end point may be connected using a line that includes the start point, the end point and the predicted one or more points. Of course, the start point and the end point may also be connected using a line in other shapes, which is not limited in the embodiments of the present disclosure. The specific shape is not intended to limit the scope of the embodiments of the present disclosure, and details are not repeated herein.

In the above screenshot manners, the touch action includes one or more kinds of touch actions, and different touch actions correspond to different screenshot manners. When the touch action is the slide action and the slide track is the closed graphic, different slide directions correspond to different screenshot manners; and the screenshot manner may be to capture all of the contents of the screen, or may be to capture part of the contents of the screen, which improves the user experience.

In one embodiment, when the terminal does not detect any touch action within a third preset time after entering the screenshot mode, the terminal exits from the screenshot mode.

In one embodiment, the method further includes a step: exiting from the screenshot mode after the part or all of the content of the screen are capture. Through this method, the terminal automatically exits from the screenshot mode after shooting the screen, and the user does not need to manually exit from the screenshot operation, thereby improving the user experience.

Figure 3:
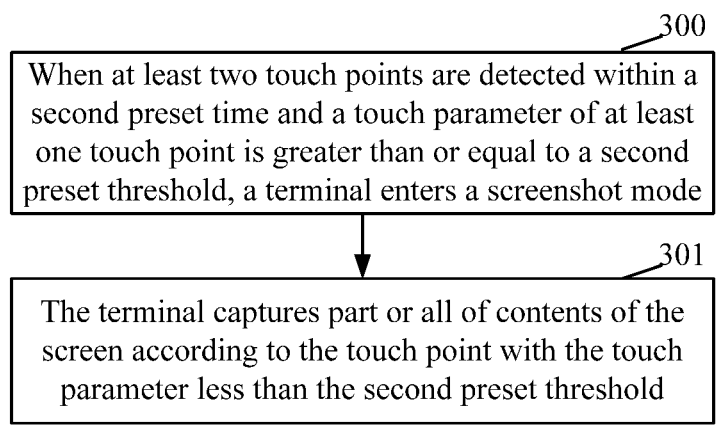
FIG. 3 is a flowchart of another method for implementing screenshot according to an embodiment of the present disclosure.

With reference to FIG. 3, the embodiments of the present disclosure provide a method for implementing screenshot. The method includes steps described below.

In step 300, when at least two touch points are detected within a second preset time and a touch parameter of at least one of these touch points is greater than or equal to a second preset threshold, a terminal enters a screenshot mode.

In this step, the second preset time may start from the time when a first touch point is detected, that is, a timer is started after the first touch point is detected. The terminal continuously detects the touch point before the timer expires, and determines whether there is a touch point whose touch parameter is greater than or equal to the second preset threshold. The third preset time may also be a period of periodic detection, that is, within each second preset time, the touch point is detected and whether there is a touch point whose touch parameter is greater than or equal to the second preset threshold is determined.

In one embodiment, when one touch point is detected within the second preset time, this touch point is normally processed as a single-point touch.

When at least two touch points are detected within the second preset time and the touch parameter of each of the touch points is less than the second preset threshold, the touch points are normally processed as a multi-point touch.

When at least two touch points are detected within the second preset time, the touch parameter of each of the touch points is less than the second preset threshold, and no touch point is detected simultaneously, each touch point is normally processed as a single-point touch.

In one embodiment, a pressing duration of the touch point with the touch parameter greater than or equal to the second preset threshold may be long or short, may be greater than or equal to a preset time threshold, or may be less than the preset time threshold, which is not limited in the present disclosure. In other words, the user may tap hard on the screen and then lifts the finger, or may continually press the screen.

In one embodiment, the above may be implemented by adopting the following manner.

When the number of touch points detected within the second preset time is greater than or equal to N and the number of touch points with the touch parameter greater than or equal to the second preset threshold is greater than or equal to M, it is considered that the trigger condition is satisfied, where N is an integer greater than or equal to 2, and M is an integer greater than or equal to 1.

Alternatively, when the number of touch points detected within the second preset time is equal to N and the number of touch points with the touch parameter greater than or equal to the second preset threshold is equal to M, it is considered that the trigger condition is satisfied.

For example, two touch points are detected within the second preset time, which are a first touch point and a second touch point respectively, and a touch parameter of the first touch point is greater than or equal to the second preset threshold. In one embodiment, after the first touch point is detected, before the second touch pint is detected, the first touch point is continuously pressed. In other words, the user uses one figure to continuously press the screen, and uses another figure to implement the touch action, so as to enable the screenshot mode.

In another example, N touch points are detected within the second preset time, which are a first touch point, a second touch point, . . . , and an N-th touch point respectively, and a touch parameter of the first touch point is greater than or equal to the second preset threshold, where N is an integer greater than or equal to 2.

The touch parameter may be a touch area or a touch pressure. The touch area may be obtained by calculating the number of pixels on the screen occupied by the touch point, and the touch pressure may be detected through a touch pressure screen or a pressure sensor.

The above manner of enabling the screenshot mode is simple and quick, which improves the success rate of enabling the screenshot mode, thereby improving the success rate of screenshot.

Of course, other manners may be used for determining whether the trigger condition is satisfied. For example, a physical or virtual button is used for enabling the screenshot mode, that is, the user enables the screenshot mode when pressing the physical or virtual button. The above manners are merely illustrative, and the specific trigger condition is not intended to limit the scope of the present disclosure, details of which are not repeated herein.

In step 301, part or all of contents of a screen are captured according to a touch point with the touch parameter less than the second preset threshold.

In this step, the touch point with the touch parameter less than the second preset threshold may be a slide action, or may be a non-slide action, such as click, double click, etc.

When the touch point with the touch parameter less than the second preset threshold is a slide action, a slide track of the slide action may be a closed graphic, or may be a non-closed graphic.

When the touch point with the touch parameter less than the second preset threshold is a slide action, part or all of the contents of the screen are captured according to a slide direction of the slide action.

When the touch point with the touch parameter less than the second preset threshold is a non-slide action, or when the touch point with the touch parameter less than the second preset threshold is a slide action and a slide track of the slide action is a non-closed graphic, all of the contents of the screen are captured.

Capturing part or all of the contents of the screen according to the slide direction of the slide action may be implemented in any one of the following manners.

In the first manner, when the slide direction is a first preset direction, the screen is shot in any one of the following screenshot manners; and when the slide direction of the slide action is a second preset direction, the screen is shot in any one of the following screenshot manners; where the screenshot manner used when the slide direction is the first preset direction is different from the screenshot manner used when the slide direction is the second preset direction.

The screenshot manners include the following five manners:

1. capturing contents within the closed graphic of the screen;
2. capturing all of the contents of the screen, and blurring contents outside the closed graphic;
3. capturing all of the contents of the screen, and blurring the contents within the closed graphic;
4. capturing the contents outside the closed graphic of the screen; and
5. capturing all of the contents of the screen.

For example, FIG. 2 is a view showing an operation on a user interface of a method for implementing screenshot according to an embodiment of the present disclosure. As shown in FIG. 2, the user first touches the lower left corner of the screen with a finger to form a touch point, where the touch area or the touch pressure of this touch point is greater than the second preset threshold, and then draws a closed graphic on the screen with another finger within the third preset time. When the user draws the closed graphic in a clockwise direction, the contents within the closed graphic are captured. When the user draws the closed graphic in the counterclockwise direction, all of the contents of the screen are captured and the contents outside the closed graphic are blurred.

In the above manner, the closed graphic may be a regular graphic, such as triangles, squares, rectangles, pentagonal stars, etc., or may be an irregular graphic, which is not limited in the present disclosure.

In the second manner, before part or all of the contents of the screen are captured according to the slide direction of the slide action, the closed graphic is preprocessed to obtain a preprocessed closed graphic, and then part or all of the contents of the screen are captured according to the slide direction of the slide action.

In one embodiment, when the slide direction is a first preset direction, the screen is shot in any one of the following screenshot manners; and when the slide direction of the slide action is a second preset direction, the screen is shot in any one of the following screenshot manners; where the screenshot manner used when the slide direction is the first preset direction is different from the screenshot manner used when the slide direction is the second preset direction.

The screenshot manners include the following five manners:

1. capturing contents within the preprocessed closed graphic of the screen;
2. capturing all of the contents of the screen, and blurring contents outside the preprocessed closed graphic;
3. capturing all of the contents of the screen, and blurring the contents within the preprocessed closed graphic;
4. capturing the contents outside the preprocessed closed graphic of the screen; and
5. capturing all of the contents of the screen.

In the above manner, since the closed graphic drawn by the user is usually an irregular graphic, the irregular graphic can be converted into a regular graphic before screenshot, so that the picture obtained after the screenshot is more beautiful, making the user satisfied. Of course, if the closed graphic drawn by the user is a regular graphic, the closed graphic may be converted into a graphic which the user desires, or the closed graphic may be converted into a graphic uniformly set by a system, details of which are not repeated herein.

In other words, the closed graphic may be preprocessed in any one of the following manners to obtain the preprocessed closed graphic:

1. converting the closed graphic into a preset closed graphic, where this preset closed graphic may be specifically set by the user, or may be uniformly set by the system;
2. converting the closed graphic into a default closed graphic, where for example, if the user does not set the preprocessed closed graphic, the closed graphic may be converted into a default system closed graphic;
3. displaying a converting available closed graphic list to the user, receiving a selection operation inputted by the user, and converting the closed graphic into a closed graphic corresponding to the selection operation in the closed graphic list; and
4. converting the closed graphic into a closed graphic with a highest matching degree in the two or more preset closed graphics.

The closed graphic list may be displayed in multiple manners. For example, the closed graphic list can be displayed in the form of a pull-down menu, and a label in the pull-down menu is used for displaying a closed graphic, or the closed graphic list may also be displayed in the form of a pop-up window, and a label in the pop-up window is used for displaying a closed graphic. Of course, the closed graphic list may also be displayed in other manners. The specific display manner is not intended to limit the scope of this disclosure, and details are not repeated herein. The ratio of an overlapping area of the closed graphic and the preprocessed closed graphic to an area of the closed graphic is greater than or equal to the third preset threshold. The preprocessed closed graphic may be any one of the following: a circumscribed circle of the closed graphic, or a square containing the closed graphic, or a circle containing the closed graphic, or a circle containing a preset length of the closed graphic, or a square containing the preset length of the closed graphic, etc. Of course, the preprocessed closed graphics enumerated above are only illustrative. The specific preprocessed closed graphic is not intended to limit the scope of the present disclosure, and details are not repeated herein.

In the above manner, the first preset direction may be the clockwise direction, or may be the counterclockwise direction, and the second preset direction may be the clockwise direction, or may be the counterclockwise direction.

When the first preset direction is the clockwise direction, the second preset direction is the counterclockwise direction; when the first preset direction is the counterclockwise direction, the second preset direction is the clockwise direction.

In one embodiment, before part or all of the contents of the screen are captured when the touch point with the touch parameter less than the second preset threshold is the slide action and the slide track of the slide action is the non-closed graphic, a start point and an end point of the slide track may be connected to form a closed graphic, and then the subsequent screenshot process is the same as the processing in the condition that the slide track is the closed graphic.

In one embodiment, when the ratio of a length of the line connecting the start point and the end point to a total length of the slide track is less than or equal to a first preset threshold, the closed graphic is formed after connecting the start point and the end point of the slide track.

In one embodiment, the start point and the end point may be connected through a straight line from the start point to the end point. The start point and the end point may also be connected through a curve from the start point to the end point, and the specific shape of the curve is not defined herein, as long as the curve from the start point to the end point and the slide track form a closed graphic. One or more points may be predicted according to the slide track, and then the start point and the end point may be connected using a line that includes the start point, the end point and the predicted one or more points. Of course, the start point and the end point may also be connected using a line in other shapes, which is not limited in the embodiments of the present disclosure. The specific shape is not intended to limit the scope of the embodiments of the present disclosure, and details are not repeated herein.

In the above screenshot manners, the touch action includes one or more kinds of touch actions, and different touch actions correspond to different screenshot manners. When the touch point with the touch parameter less than the second preset threshold is the slide action and the slide track is the closed graphic, different slide directions correspond to different screenshot manners; and the screenshot manner may be to capture all of the contents of the screen, or may be to capture part of the contents of the screen, which improves the user experience.

In one embodiment, the method further includes a step: exiting from the screenshot mode after the part or all of the content of the screen are capture. Through this method, the terminal automatically exits from the screenshot mode after capturing the screen, and the user does not need to manually exit from the screenshot operation, thereby improving the user experience.

The embodiments of the present disclosure are described below in detail in conjunction with embodiments.

In one embodiment, the screenshot mode is enabled by detecting a turning action, and then the screenshot is performed by detecting a touch action.

Figure 4:
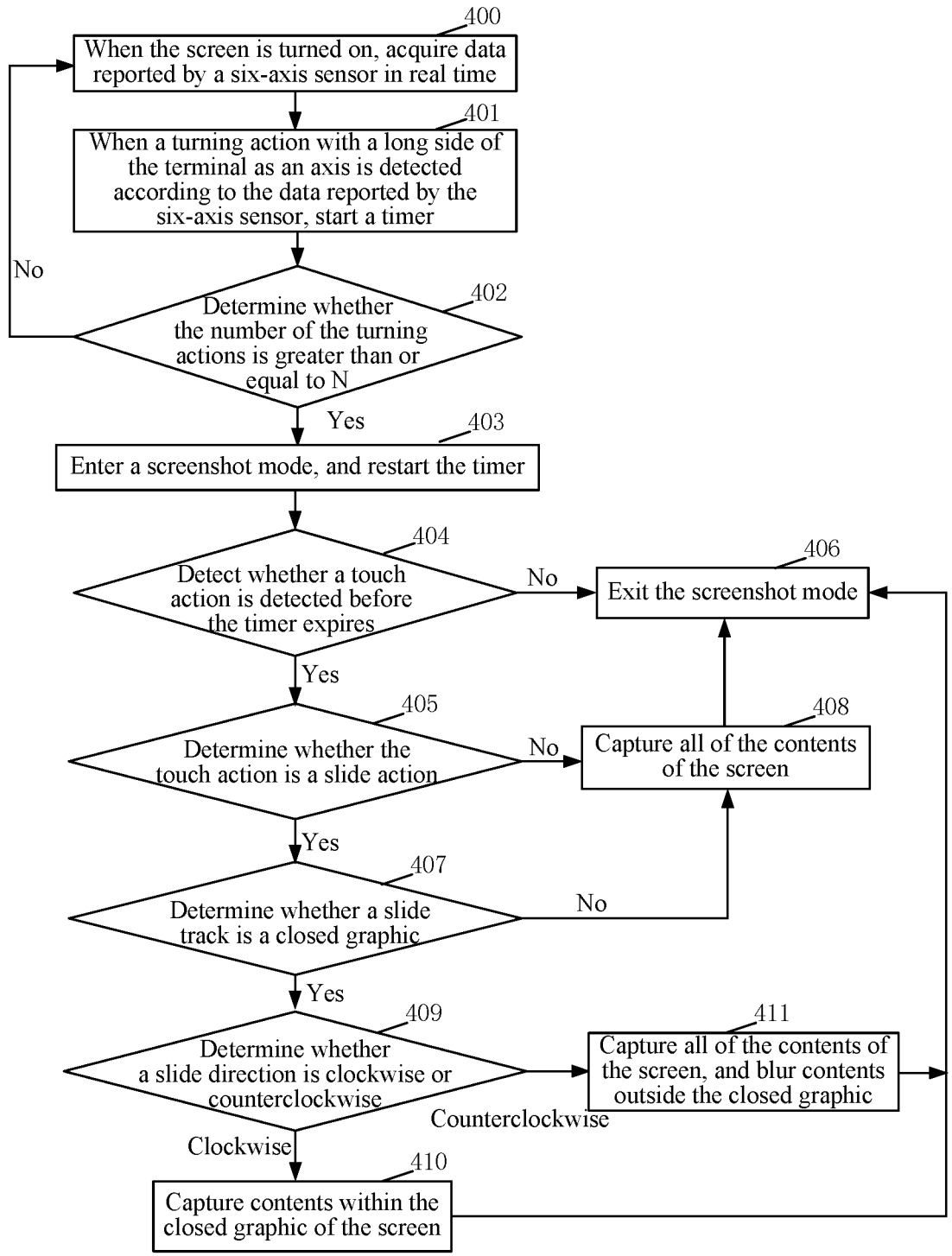
FIG. 4 is a flowchart of the method for implementing screenshot in the embodiment of the present disclosure.

FIG. 4 is a flowchart of the method for implementing screenshot in the embodiment of the present disclosure. As shown in FIG. 4, the method includes steps described below.

In step 400, when the screen is on, data reported by a six-axis sensor is acquired in real time.

In this step, the six-axis sensor is a gyroscope plus an acceleration sensor. The data reported by the gyroscope includes a three-axis angular velocity, and the data reported by the acceleration sensor includes a three-axis acceleration.

In step 401, when a turning action with respect to a long side of the terminal is detected according to the data reported by the six-axis sensor, a timer is started.

In this step, the time of the timer is a first preset time, such as 10 seconds, etc.

In this step, pose angles of three axes of the terminal are determined according to the data reported by the six-axis sensor, and whether there is a turning action is determined according to the pose angles of three axes of the terminal.

In step 402, when the timer expires, whether the number of turning actions is greater than or equal to N is determined, and if the number of times is greater than or equal to N, the method proceeds to step 403, otherwise, the method goes back to step 400.

In this step, for example, N is 2, that is, there are two turning actions within 10 seconds, the screenshot mode is turned on. These two turning actions may include the turning action detected before the timer is started, or may not include the turning action detected before the timer is started.

In step 403, the screenshot mode is enabled, and the timer is restarted.

In this step, the time of the timer is a third preset time, such as 5 seconds, etc.

In step 404, whether there is a touch action before the timer expires is detected. If there is a touch action, the method proceeds to step 405, otherwise, the method proceeds to step 406.

In step 405, whether the touch action is a slide action is determined, and if the touch action is a slide action, the method proceeds to step 407, otherwise, the method proceeds to step 408. In step 406, the screenshot mode is disabled.

In step 407, whether a slide track is a closed graphic is determined. If the slide track is a closed graphic, the method proceeds to step 409, otherwise, the method proceeds to step 408.

In step 408, all of the contents of the screen are captured, and the method goes back to step 406.

In step 409, whether a slide direction is clockwise or counterclockwise is determined. If the slide direction is clockwise, the method proceeds to step 410, and if the slide direction is counterclockwise, the method proceeds to step 411.

In step 410, contents within the closed graphic of the screen are captured, and the method proceeds to step 406.

In step 411, all of the contents of the screen are captured, contents outside the closed graphic are blurred, and the method proceeds to step 406.

In one embodiment, the screenshot mode is turned on by detecting the touch point, and then the screenshot is performed by detecting the touch action.

Figure 5:
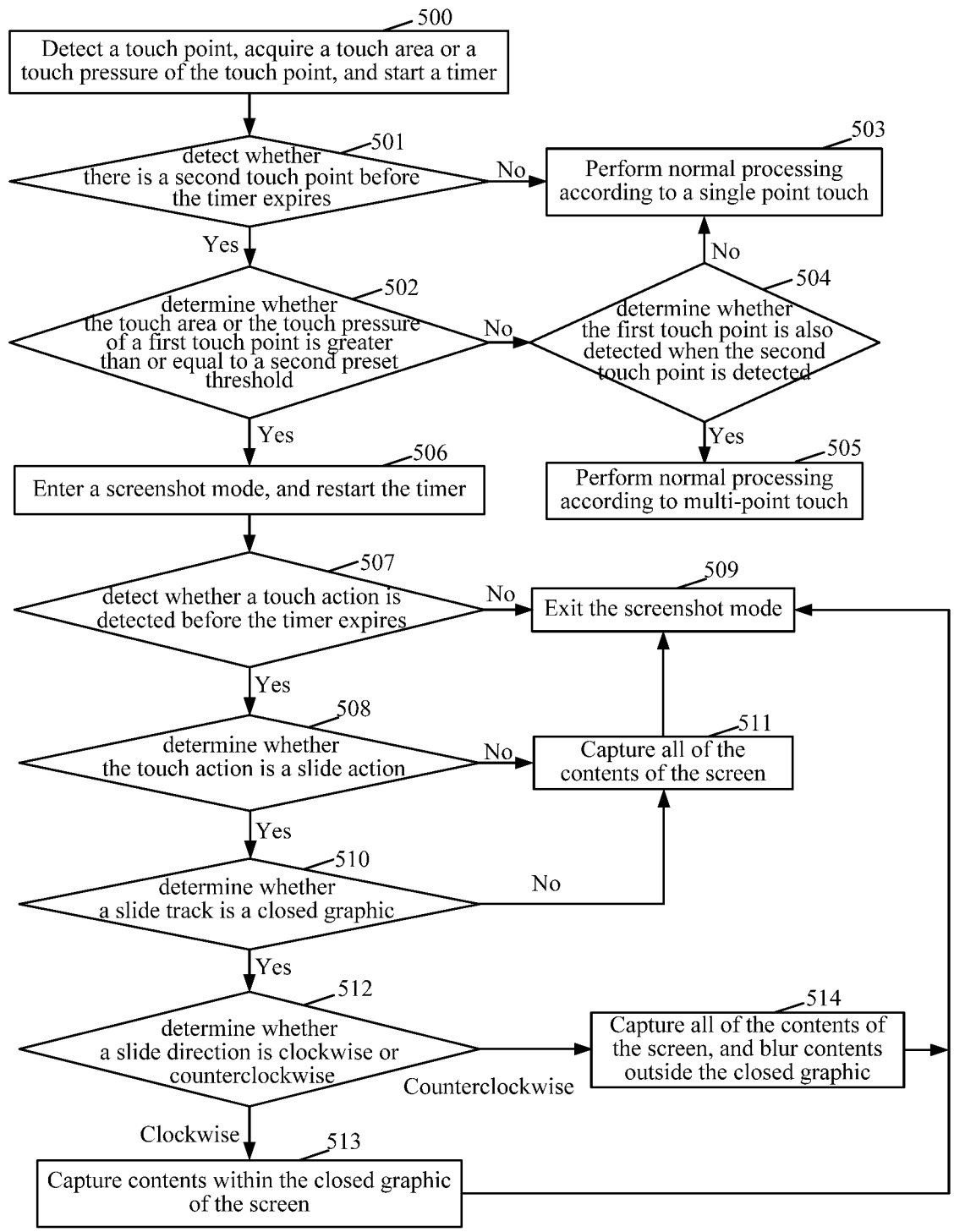
FIG. 5 is a flowchart of the method for implementing screenshot in the embodiment of the present disclosure.

FIG. 5 is a flowchart of the method for implementing screenshot in the embodiment of the present disclosure. As shown in FIG. 5, the method includes steps described below.

In step 500, a touch point is detected, a touch area or a touch pressure of the touch point is acquired, and a timer is started.

In this step, the time of the timer is a second preset time, such as 10 seconds, etc.

In step 501, whether there is a second touch point before the timer expires is detected, and if there is a second touch point, the method proceeds to step 502, otherwise, the method proceeds to step 503.

In step 502, whether the touch area or the touch pressure of the first touch point is greater than or equal to the second preset threshold is determined, and if the touch area or the touch pressure of the first touch point is greater than or equal to the second preset threshold, the method proceeds to step 506, otherwise, the method proceeds to step 504.

In step 503, normal processing is performed according to a single-point touch.

In step 504, whether the second touch point is detected at the same time when the first touch point is detected is determined, and if the two touch points are detected at the same time, the method proceeds to step 505, otherwise, the method proceeds to step 503.

In step 505, normal processing is performed according to a multi-point touch.

In step 506, the screenshot mode is on, and the timer is restarted.

In this step, the time of the timer is a third preset time, such as 5 seconds, etc.

In step 507, whether there is a touch action before the timer expires is detected, and if there is a touch action, the method proceeds to step 508, otherwise, the method proceeds to step 509.

In step 508, whether the touch action is a slide action is determined, and if the touch action is a slide action, the method proceeds to step 510, otherwise, the method proceeds to step 511.

In step 509, the screenshot mode is off.

In step 510, whether a slide track is a closed graphic is determined, and if the slide track is a closed graphic, the method proceeds to step 512, otherwise, the method proceeds to step 511.

In step 511, all of the contents of the screen are captured, and the method goes back step to 509.

In step 512, whether a slide direction is clockwise or counterclockwise is determined, if the slide direction is clockwise, the method proceeds to step 513, and if the slide direction is counterclockwise, the method proceeds to step 514.

In step 513, contents within the closed graphic of the screen are captured, and the method proceeds to step 509.

In step 514, all of the contents of the screen are captured, contents outside the closed graphic are blurred, and the method proceeds to step 509.

In one embodiment, the screenshot mode is turned on by detecting the touch point, and then the screenshot is performed by detecting the touch action.

Figure 6:
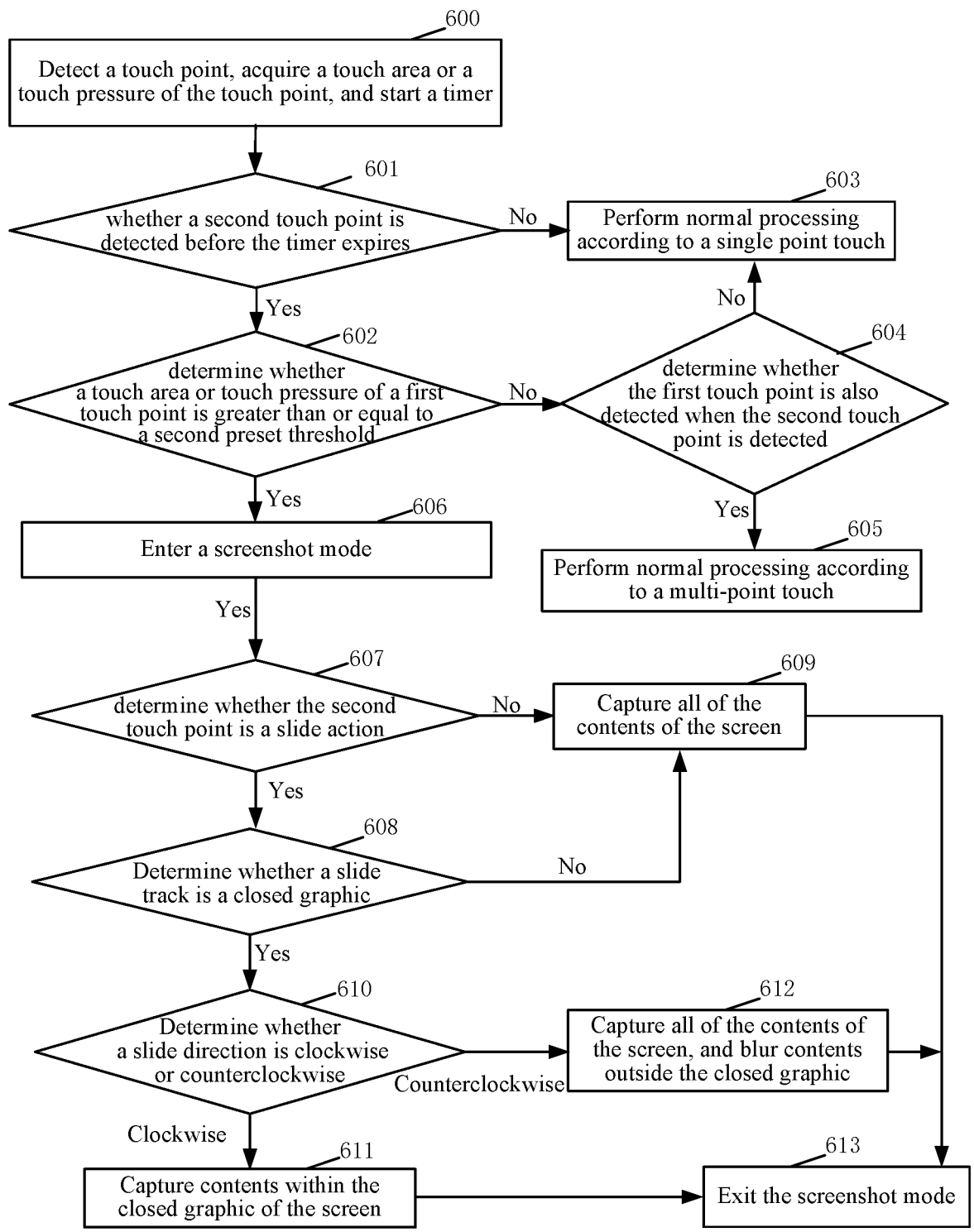
FIG. 6 is a flowchart of a method for implementing screenshot according to an embodiment of the present disclosure.

FIG. 6 is a flowchart of a method for implementing screenshot according to an embodiment of the present disclosure. As shown in FIG. 6, the method includes steps described below.

In step 600, a touch point is detected, a touch area or a touch pressure of the touch point is acquired, and a timer is started.

In this step, the time of the timer is a second preset time, such as 10 seconds, etc.

In step 601, whether there is a second touch point before the timer expires is detected, and if there is a second touch point, the method proceeds to step 602, otherwise, the method proceeds to step 603.

In step 602, whether the touch area or the touch pressure of the first touch point is greater than or equal to the second preset threshold is determined, and if the touch area or the touch pressure of the first touch point is greater than or equal to the second preset threshold, the method proceeds to step 606, otherwise, the method proceeds to step 604.

In step 603, normal processing is performed according to a single-point touch.

In step 604, whether the first touch point is detected at the same time when the second touch point is detected is determined, and if the two touch points are detected at the same time, the method proceeds to step 605, otherwise, the method proceeds to step 603.

In step 605, normal processing is performed according to a multi-point touch.

In step 606, the screenshot mode is on.

In step 607, whether the second touch point is a slide action is determined, and if the second touch action is a slide action, the method proceeds to step 608, otherwise, the method proceeds to step 609.

In step 608, whether a slide track is a closed graphic is determined, and if the slide track is a closed graphic, the method proceeds to step 610, otherwise, the method proceeds to step 609.

In step 609, all of the contents of the screen are captured, and the method proceeds to step 613.

In step 610, whether a slide direction is clockwise or counterclockwise is determined, if the slide direction is clockwise, the method proceeds to step 611, and if the slide direction is counterclockwise, the method proceeds to step 612.

In step 611, contents within the closed graphic of the screen are captured, and the method proceeds to step 613.

In step 612, all of the contents of the screen are captured, contents outside the closed graphic are blurred, and the method proceeds to step 613.

In step 613, the screenshot mode is off.

Figure 7:
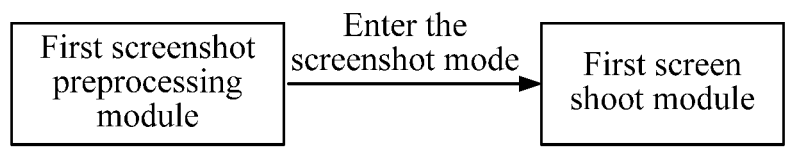
FIG. 7 is a structural diagram of a device for implementing screenshot according to an embodiment of the present disclosure.

FIG. 7 is a structural diagram of a device for implementing screenshot according to an embodiment of the present disclosure. As shown in FIG. 7, the device includes a first screenshot preprocessing module and a first screen shoot module.

The first screenshot preprocessing module is configured to, in response to determining that a trigger condition is satisfied, enter a screenshot mode by a terminal.

The first screen shoot module is configured to, when the terminal detects a touch action after entering the screenshot mode, capture part or all of contents of a screen according to the touch action.

In one embodiment, the first screen shoot module is configured to: when the terminal detects a touch action after entering the screenshot mode, and when the touch action is a slide action, capture part or all of contents of a screen according to a slide direction of the slide action.

In one embodiment, the first screen shoot module is further configured to: when the touch action is a non-slide action, or when the touch action is a slide action and a slide track of the slide action is a non-closed graphic, capture all of the contents of the screen.

In one embodiment, the first screenshot preprocessing module is further configured to: when the number of times the preset action is detected within the first preset time is greater than or equal to the preset number of times, enter the screenshot mode.

In one embodiment, the first screenshot preprocessing module is further configured to: when at least two touch points are detected within a second preset time and a touch parameter of at least one of the touch points is greater than or equal to a second preset threshold, enter the screenshot mode.

In one embodiment, the first screen shoot module is further configured to: when the terminal detects the touch action after entering the screenshot mode, the touch action is a slide action and a slide track of the slide action is a non-closed graphic, connect a start point and an end point of the slide track to form a closed graphic, and capture part or all of the contents of the screen according to the slide direction of the slide action. The line connecting the start point and the end point is a straight line or a curve, or the line connecting the start point and the end point passes through one or more points predicted according to the slide track.

In one embodiment, the first screen shoot module is further configured to: when the terminal detects the touch action after entering the screenshot mode, the touch action is the slide action and a slide track of the slide action is a closed graphic, and when a side direction of the slide action is a first preset direction, capture the screen by using any one of the following screenshot manners; and when the slide direction of the slide action is a second preset direction, capture the screen by using any one of the following screenshot manners. The screenshot manner used when the slide direction is the first preset direction is different from the screenshot manner used when the slide direction is the second preset direction.

The screenshot manners include: capturing contents within the closed graphic of the screen; capturing all of the contents of the screen, and blurring the contents within the closed graphic; capturing all of the contents of the screen, and blurring contents outside the closed graphic; capturing the contents outside the closed graphic of the screen; and capturing all of the contents of the screen.

In one embodiment, the first screen shoot module is further configured to: when the terminal detects the touch action after entering the screenshot mode, the touch action is the slide action and the slide track of the slide action is a closed graphic, perform preprocessing on the closed graphic to obtain a preprocessed closed graphic, where the ratio of an overlapping area of the closed graphic and the preprocessed closed graphic to an area of the closed graphic is greater than or equal to a third preset threshold; and when the slide direction of the slide action is a first preset direction, capture the screen by using any one of the following screenshot manners; and when the slide direction of the slide action is a second preset direction, capture the screen by using any one of the following screenshot manners; where the screenshot manner used when the slide direction is the first preset direction is different from the screenshot manner used when the slide direction is the second preset direction.

The screenshot manners include: capturing contents within the preprocessed closed graphic of the screen; capturing all of the contents of the screen, and blurring the contents within the preprocessed closed graphic; capturing all of the contents of the screen, and blurring contents outside the preprocessed closed graphic; capturing the contents outside the preprocessed closed graphic of the screen; and capturing all of the contents of the screen.

Figure 8:
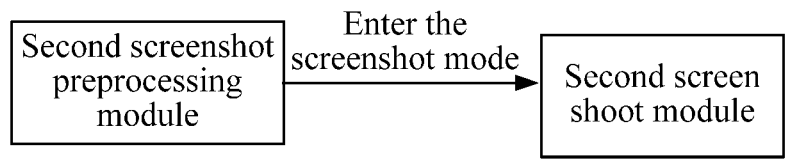
FIG. 8 is a structural diagram of another device for implementing screenshot according to an embodiment of the present disclosure.

FIG. 8 is a structural diagram of another device for implementing screenshot according to an embodiment of the present disclosure. As shown in FIG. 8, the device includes a second screenshot preprocessing module and a second screen shoot module.

The second screenshot preprocessing module is configured to, when at least two touch points are detected within a second preset time and a touch parameter of at least one of the touch points is greater than or equal to a second preset threshold, enter a screenshot mode by a terminal.

The second screen shoot module is configured to capture part or all of contents of a screen according to a touch point with the touch parameter less than the second preset threshold.

In one embodiment, the second screen shoot module is further configured to: when the touch point with the touch parameter less than the second preset threshold is a slide action, capture part or all of the contents of the screen according to a slide direction of the slide action.

In one embodiment, the second screen shoot module is further configured to: when the touch point with the touch parameter less than the second preset threshold is a non-slide action, or when the touch point with the touch parameter less than the second preset threshold is a slide action and a slide track of the slide action is a non-closed graphic, capture all of the contents of the screen.

A line connecting the start point and the end point is a straight line or a curve; or the line connecting the start point and the end point passes through one or more points predicted according to the slide track.

In one embodiment, the second screen shoot module is further configured to: when the touch point with the touch parameter less than the second preset threshold is the slide action and the slide track of the slide action is the non-closed graphic, connect a start point and an end point of the slide track to form a closed graphic, and capture part or all of the contents of the screen according to a slide direction of the slide action.

In one embodiment, the second screen capturing module is further configured to: when the touch point with the touch parameter less than the second preset threshold is the slide action and a slide track of the slide action is a closed graphic, and when a side direction of the slide action is a first preset direction, capture the screen in any one of the following screenshot manners; and when the slide direction of the slide action is a second preset direction, capture the screen in any one of the following screenshot manners; where the screenshot manner used when the slide direction is the first preset direction is different from the screenshot manner used when the slide direction is the second preset direction;

The screenshot manners include: capturing contents within the closed graphic of the screen; capturing all of the contents of the screen, and blurring the contents within the closed graphic; capture all of the contents of the screen, and blurring contents outside the closed graphic; capturing the contents outside the closed graphic of the screen; and capturing all of the contents of the screen.

In one embodiment, the second screen capturing module is further configured to: when the touch point with the touch parameter less than the second preset threshold is the slide action and the slide track of the slide action is a closed graphic, perform preprocessing on the closed graphic to obtain a preprocessed closed graphic, where the ratio of an overlapping area of the closed graphic and the preprocessed closed graphic to an area of the closed graphic is greater than or equal to a third preset threshold; and when the slide direction of the slide action is a first preset direction, capture the screen in any one of the following screenshot manners; and when the slide direction of the slide action is a second preset direction, capture the screen in any one of the following screenshot manners; where the screenshot manner used when the slide direction is the first preset direction is different from the screenshot manner used when the slide direction is the second preset direction.

The screenshot manners include: capture contents within the preprocessed closed graphic of the screen; capture all of the contents of the screen, and blurring the contents within the preprocessed closed graphic; capture all of the contents of the screen, and blurring contents outside the preprocessed closed graphic; capture the contents outside the preprocessed closed graphic of the screen; and capture all of the contents of the screen.

Figure 9:
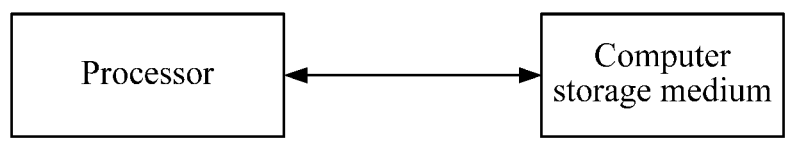
FIG. 9 is a structural diagram of a terminal according to an embodiment of the present disclosure.

FIG. 9 is a structural diagram of a terminal according to an embodiment of the present disclosure. As shown in FIG. 9, the terminal includes a processor and a computer-readable storage medium. The computer-readable storage medium stores instructions which, when executed by the processor, implement any one of methods for implementing screenshot described above.

The computer-readable storage medium includes any one or more of the following: a flash memory, a hard disk, a multimedia card, a card-type memory (such as a secure digital card (SD card) or a data register (DX) memory), a random access memory (RAM), a static random access memory (SRAM), a read only memory (ROM), an electrically erasable programmable read-only memory (EEPROM), a programmable read-only memory (PROM), a magnetic memory, a magnetic disk, an optical disc, and the like.

The processor may be a central processing unit (CPU), a controller, a microcontroller, a microprocessor, or other data processing chips, or the like.

The embodiments of the present disclosure further provide a computer-readable storage medium. The computer-readable storage medium stores a computer program which, when executed by a processor, implements any one of methods for implementing screenshot described above.

Any person skilled in the art to which the present disclosure pertains may make any modifications and changes in the form of implementation and details without departing from the spirit and scope disclosed by the present disclosure, but the protection scope of the present patent is still subject to the scope defined by the appended claims.

What is claimed is:

1. A method for implementing screenshot, comprising:
   in response to a trigger condition being satisfied, entering, by a terminal, a screenshot mode; and
   when the terminal detects a touch action after entering the screenshot mode, capturing, by the terminal according to the touch action, part or all of contents of a screen,
   wherein capturing part or all of the contents of the screen according to the touch action comprises:

in response to the touch action being a slide action, capturing part or all of the contents of the screen according to a slide direction of the slide action;

wherein in response to the touch action being the slide action and a slide track of the slide action being a closed graphic, capturing part or all of the contents of the screen according to the slide direction of the slide action comprises:

in response to the slide direction of the slide action being a first preset direction, shooting the screen in any one of the following screenshot manners; and in response to the slide direction of the slide action being a second preset direction, shooting the screen by using any one of the following screenshot manners; wherein the screenshot manner used when the slide direction is the first preset direction is different from the screenshot manner used when the slide direction is the second preset direction; and wherein the screenshot manners comprise:

capturing contents within the closed graphic of the screen;

capturing all of the contents of the screen, and blurring the contents within the closed graphic;

capturing all of the contents of the screen, and blurring contents outside the closed graphic;

capturing the contents outside the closed graphic of the screen; and capturing all of the contents of the screen.

2. The method of claim 1, wherein satisfying the trigger condition comprises: a number of times a preset action is detected within a first preset time is greater than or equal to a preset number of times.

3. The method of claim 1, wherein satisfying the trigger condition comprises: at least two touch points are detected within a first preset time, and a touch parameter of at least one of the at least two touch points is greater than or equal to a first preset threshold.

4. The method of claim 1, wherein capturing part or all of the contents of the screen according to the touch action further comprises:

in response to the touch action being a non-slide action or in response to the touch action being the slide action and the slide track of the slide action being a non-closed graphic, capturing all of the contents of the screen.

5. The method of claim 1, wherein before capturing part or all of the contents of the screen in response to the touch action being the slide action and the slide track of the slide action being a non-closed graphic, the method further comprises: connecting a start point and an end point of the slide track and forming a closed graphic corresponding to the non-closed graphic;

wherein a line connecting the start point and the end point is a straight line or a curve; or the line connecting the start point and the end point comprises one or more points predicted according to the slide track.

6. The method of claim 5, wherein in response to a ratio of a length of the line connecting the start point and the end point to a total length of the slide track being less than or equal to a first preset threshold, the start point and the end point of the slide track are connected and the closed graphic corresponding to the non-closed graphic is formed.

7. The method of claim 1, wherein before in response to the touch action being the slide action and the slide track of the slide action being the closed graphic, capturing part or all of the contents of the screen according to the slide direction of the slide action, the method further comprises:

performing preprocessing on the closed graphic to obtain a preprocessed closed graphic, wherein a ratio of an overlapping area of the closed graphic and the preprocessed closed graphic to an area of the closed graphic is greater than or equal to a first preset threshold.

8. The method of claim 7, wherein performing preprocessing on the closed graphic to obtain the preprocessed closed graphic comprises:

converting the closed graphic into a preset closed graphic; or converting the closed graphic into a default closed graphic; or displaying to a user a closed graphic list that is available for converting, receiving a selection operation inputted by the user, and converting the closed graphic into a closed graphic corresponding to the selection operation in the closed graphic list; or converting the closed graphic into one with a highest matching degree among two or more preset closed graphics.

9. The method of claim 7, wherein the first preset direction is a clockwise direction, and the second preset direction is a counterclockwise direction; or the first preset direction is the counterclockwise direction, and the second preset direction is the clockwise direction.

10. A terminal, comprising:

a memory, which is configured to store a program for implementing screenshot; and a processor, which is configured to execute the program, wherein the program, when executed, implements the method for implementing screenshot of claim 1.

11. A method for implementing screenshot, comprising:

in response to detecting at least two touch points within a first preset time and a touch parameter of at least one of the at least two touch points being greater than or equal to a first preset threshold, entering, by a terminal, a screenshot mode; and capturing part or all of contents of a screen according to the touch point with the touch parameter less than the first preset threshold, wherein capturing part or all of the contents of the screen according to the touch point with the touch parameter less than the first preset threshold comprises:

in response to the touch point with the touch parameter less than the first preset threshold being a slide action, capturing part or all of the contents of the screen according to a slide direction of the slide action;

wherein in response to the touch point with the touch parameter less than the first preset threshold being the slide action and a slide track of the slide action being a closed graphic, capturing part or all of the contents of the screen according to the slide direction of the slide action comprises:

in response to the slide direction of the slide action being a first preset direction, shooting the screen in any one of the following screenshot manners; and in response to the slide direction of the slide action being a second preset direction, shooting the screen in any one of the following screenshot manners; wherein the screenshot manner used when the slide direction is the first preset direction is different from the screenshot manner used when the slide direction is the second preset direction; and wherein the screenshot manners comprise:

capturing contents within the closed graphic of the screen;

capturing all of the contents of the screen, and blurring the contents within the closed graphic;

capturing all of the contents of the screen, and blurring contents outside the closed graphic;

capturing the contents outside the closed graphic of the screen; and capturing all of the contents of the screen.

12. The method of claim 11, wherein capturing part or all of the contents of the screen according to the touch point with the touch parameter less than the first preset threshold further comprises:

in response to the touch point with the touch parameter less than the first preset threshold being a non-slide action or in response to the touch point with the touch parameter less than the first preset threshold being the slide action and the slide track being a non-closed graphic, capturing all of the contents of the screen.

13. The method of claim 11, wherein before in response to the touch point with the touch parameter less than the first preset threshold being the slide action and the slide track of the slide action being a non-closed graphic, capturing part or all of the contents of the screen according to the slide direction of the slide action, the method further comprises:
connecting a start point and an end point of the slide track and forming a closed graphic corresponding to the non-closed graphic;

wherein a line connecting the start point and the end point is a straight line or a curve; or the line connecting the start point and the end point comprises one or more points predicted according to the slide track.

14. The method of claim 13, wherein in response to a ratio of a length of the line connecting the start point and the end point to a total length of the slide track being less than or equal to a second preset threshold, the start point and the end point of the slide track are connected to form the closed graphic corresponding to the non-closed graphic.

15. The method of claim 11, wherein before in response to the touch point with the touch parameter less than the first preset threshold being the slide action and the slide track of the slide action being the closed graphic, capturing part or all of the contents of the screen according to the slide direction of the slide action, the method further comprises:

performing preprocessing on the closed graphic to obtain a preprocessed closed graphic, wherein a ratio of an overlapping area of the closed graphic and the preprocessed closed graphic to an area of the closed graphic is greater than or equal to a second preset threshold.

16. The method of claim 11, wherein a pressing duration of the touch point with the touch parameter greater than or equal to the first preset threshold is greater than or equal to a preset time threshold, and the touch parameter comprises a touch area or a touch pressure.

17. A terminal, comprising:
a memory, which is configured to store a program for implementing screenshot; and
a processor, which is configured to execute the program, wherein the program, when executed, implements the method for implementing screenshot of claim 11.

* * * * *